US012659165B2

(12) United States Patent
Macieira et al.

(10) Patent No.: US 12,659,165 B2
(45) Date of Patent: *Jun. 16, 2026

(54) SECURE AGGREGATION OF IoT MESSAGES

(71) Applicant: Intel Corporation, Santa Clara, CA (US)

(72) Inventors: Thiago Macieira, Portland, OR (US); Ned M. Smith, Beaverton, OR (US); Joseph Morrow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/206,425

(22) Filed: Jun. 6, 2023

(65) Prior Publication Data

US 2023/0327878 A1     Oct. 12, 2023

Related U.S. Application Data

(63) Continuation of application No. 17/006,398, filed on Aug. 28, 2020, now Pat. No. 11,695,565, which is a
(Continued)

(51) Int. Cl.
*H04L 29/06*     (2006.01)
*H04L 9/32*      (2006.01)
(Continued)

(52) U.S. Cl.
CPC ......... *H04L 9/3239* (2013.01); *H04L 9/3247* (2013.01); *H04L 9/3297* (2013.01);
(Continued)

(58) Field of Classification Search
None
See application file for complete search history.

(56) References Cited

U.S. PATENT DOCUMENTS 10,764,058 B2     9/2020   Madeira et al.
10,917,293 B2 *   2/2021   Jeuk ................... H04L 41/0889
(Continued)

OTHER PUBLICATIONS

"U.S. Appl. No. 16/024,286, Notice of Allowance mailed Apr. 23, 2020", 9 pgs.
(Continued)

*Primary Examiner* — Shin-Hon (Eric) Chen
(74) *Attorney, Agent, or Firm* — Schwegman Lundberg & Woessner, P.A.

(57)     ABSTRACT

A system includes processing circuitry; and a memory device including instructions embodied thereon, wherein the instructions, which when executed by the processing circuitry, configure the processing circuitry to perform operations comprising: accessing input data, at an aggregator node, the input data including sensor data from a plurality of sensor nodes, each sensor data having a respective signature; validating the sensor data by using respective cryptographic hash functions on the sensor data and evaluating the respective result using the respective signature; performing an aggregation function on the sensor data to produce aggregate data; executing a hash function on the aggregate data to produce a hash value for the aggregate data; bundling the sensor data, respective signatures of the sensor data, aggregate data, and hash value for the aggregate data in a data structure; and exposing the data structure to subscriber nodes on the IoT network.

18 Claims, 8 Drawing Sheets

Related U.S. Application Data continuation of application No. 16/024,286, filed on Jun. 29, 2018, now Pat. No. 10,764,058.

(51) Int. Cl.

| | |
|---|---|
| *H04L 41/122* | (2022.01) |
| *H04L 41/5003* | (2022.01) |
| *H04L 67/04* | (2022.01) |
| *H04L 67/10* | (2022.01) |
| *H04L 67/12* | (2022.01) |
| *H04L 67/566* | (2022.01) |
| *H04W 12/106* | (2021.01) |
| *H04L 9/40* | (2022.01) |
| *H04W 12/069* | (2021.01) |
| *H04W 12/61* | (2021.01) |

(52) U.S. Cl.
CPC ........ *H04L 41/122* (2022.05); *H04L 41/5003* (2013.01); *H04L 67/04* (2013.01); *H04L 67/10* (2013.01); *H04L 67/12* (2013.01); *H04L 67/566* (2022.05); *H04W 12/106* (2021.01); *H04L 63/0823* (2013.01); *H04W 12/069* (2021.01); *H04W 12/61* (2021.01)

(56) References Cited

U.S. PATENT DOCUMENTS

| | | | | |
|---|---|---|---|---|
| 2007/0071021 | A1* | 3/2007 | Girao | G06F 9/546 |
| | | | | 370/411 |
| 2008/0262798 | A1* | 10/2008 | Kim | H04L 67/12 |
| | | | | 702/189 |
| 2008/0306885 | A1* | 12/2008 | Cordery | G07B 17/00733 |
| | | | | 705/410 |
| 2014/0149740 | A1* | 5/2014 | Sato | H04L 9/006 |
| | | | | 713/158 |
| 2014/0222813 | A1* | 8/2014 | Yang | G06F 16/95 |
| | | | | 707/736 |
| 2014/0237611 | A1* | 8/2014 | Dent | H04L 9/14 |
| | | | | 726/26 |
| 2016/0364223 | A1* | 12/2016 | Vandikas | G06Q 20/3825 |
| 2017/0235970 | A1* | 8/2017 | Conner | G06F 21/44 |
| | | | | 707/690 |
| 2017/0359237 | A1* | 12/2017 | Hao | G06F 21/44 |
| 2018/0013287 | A1* | 1/2018 | Roose | H02J 3/1828 |
| 2018/0013824 | A1* | 1/2018 | Knopf | H04L 67/1095 |
| 2018/0284735 | A1* | 10/2018 | Cella | G05B 23/0286 |
| 2018/0288130 | A1* | 10/2018 | Sandfort | H04L 67/52 |
| 2019/0013948 | A1* | 1/2019 | Mercuri | G06Q 20/3827 |
| 2019/0044726 | A1 | 2/2019 | Macieira et al. | |
| 2019/0230075 | A1* | 7/2019 | Neild | H04L 63/02 |
| 2019/0327152 | A1* | 10/2019 | Shemer | H04L 41/32 |
| 2021/0091958 | A1 | 3/2021 | Macieira et al. | |

OTHER PUBLICATIONS

"U.S. Appl. No. 17/006,398, Notice of Allowance mailed Feb. 23, 2023", 12 pgs.

"U.S. Appl. No. 17/006,398, Preliminary Amendment filed Dec. 11, 2020", 7 pgs.

* cited by examiner

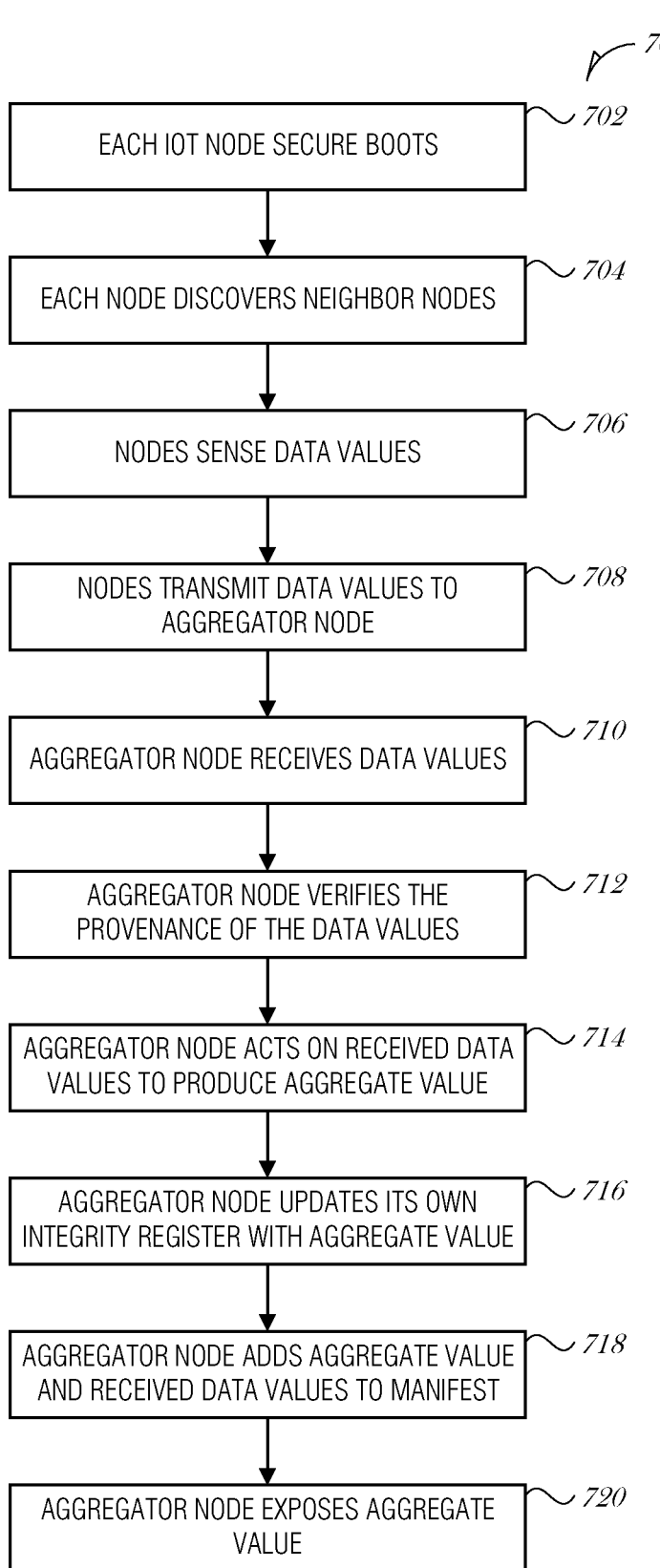

*700*

*702* EACH IOT NODE SECURE BOOTS

*704* EACH NODE DISCOVERS NEIGHBOR NODES

*706* NODES SENSE DATA VALUES

*708* NODES TRANSMIT DATA VALUES TO AGGREGATOR NODE

*710* AGGREGATOR NODE RECEIVES DATA VALUES

*712* AGGREGATOR NODE VERIFIES THE PROVENANCE OF THE DATA VALUES

*714* AGGREGATOR NODE ACTS ON RECEIVED DATA VALUES TO PRODUCE AGGREGATE VALUE

*716* AGGREGATOR NODE UPDATES ITS OWN INTEGRITY REGISTER WITH AGGREGATE VALUE

*718* AGGREGATOR NODE ADDS AGGREGATE VALUE AND RECEIVED DATA VALUES TO MANIFEST

*720* AGGREGATOR NODE EXPOSES AGGREGATE VALUE

*FIG. 7*

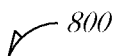
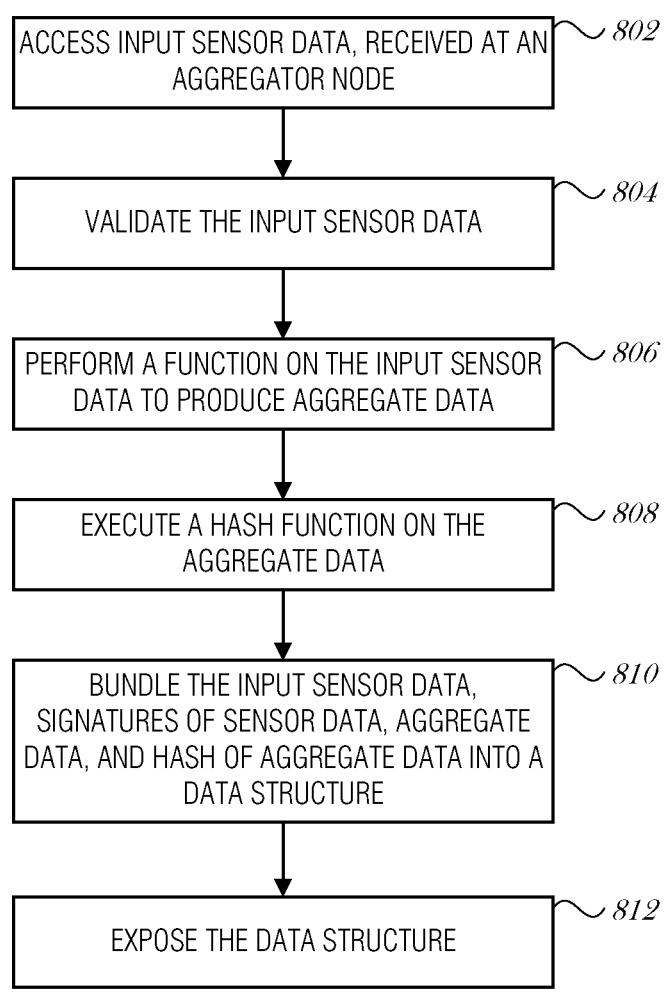
*FIG. 8*

SECURE AGGREGATION OF IoT MESSAGES

This application is a continuation of U.S. application Ser. No. 17/006,398, filed Aug. 28, 2020, which is a continuation of U.S. patent application Ser. No. 16/024,286, filed Jun. 29, 2018, now issued as U.S. Pat. No. 10,764,058, all of which are incorporated herein by reference in their entirety.

TECHNICAL FIELD

Embodiments described herein generally relate to data processing and security authentication techniques, and in particular, to techniques for establishing and implementing functionality for data processing and security authentication for internet of things (IoT) devices and device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 7 is a flowchart illustrating a method of using integrity values, according to an embodiment; and FIG. 8 is a flowchart illustrating a method for using hash signatures to validate data in an internet of things (IoT) network, according to an embodiment.

DETAILED DESCRIPTION

Figure 1:
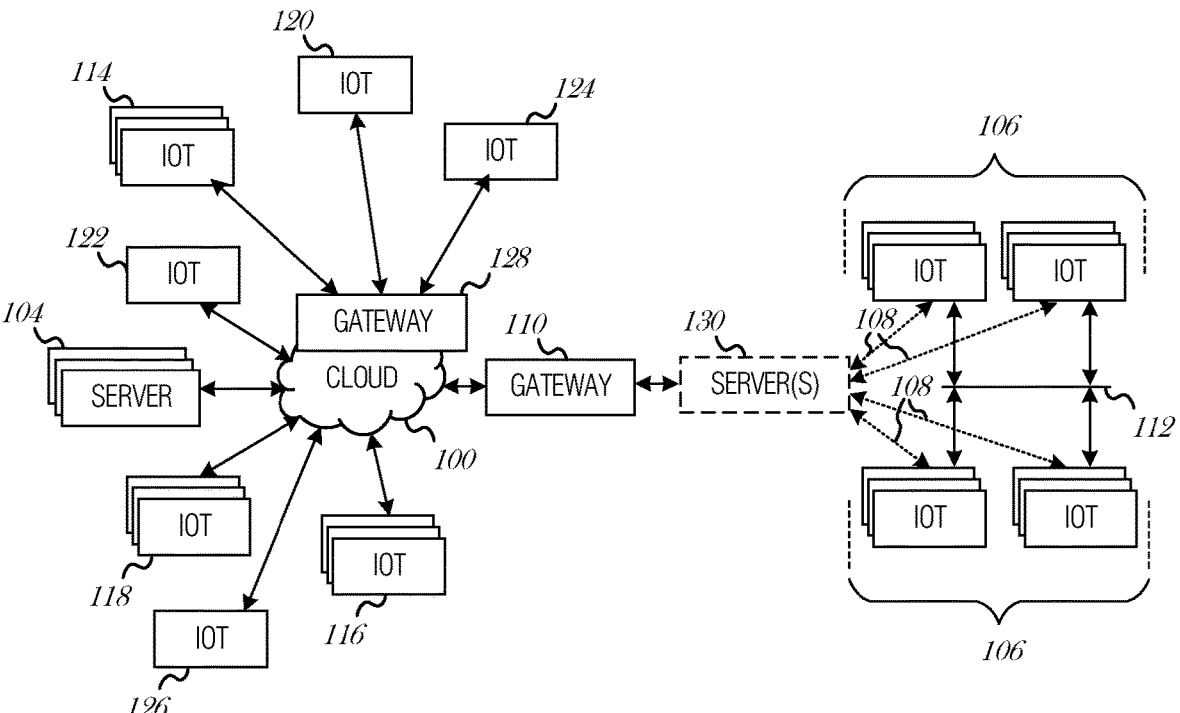
FIG. 1 illustrates a drawing of a cloud computing network, or cloud, in communication with a number of Internet of Things (IoT) devices.

The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, even larger devices such as a smart phone, laptop, tablet, or PC, may be used as an IoT device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

The network topology involved with IoT devices and networks may include any number of topologies or arrangements, such as a mesh network provided using Bluetooth low energy (BLE) links; a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links.

Clusters of IoT devices may be equipped to communicate with other IoT devices as well as with a cloud network. This may allow the IoT devices to form an ad-hoc network between the devices, allowing them to function as a single device, which may be termed a fog device. A "fog" may be considered to be a massively interconnected network wherein a number of IoT devices are in communications with each other, for example, by radio links.

The fog network may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge," "fog," and "cloud" are not necessarily discrete or exclusive of one another.

The fog provided from these IoT devices may be presented to devices in a cloud network, such as a server, as a single device located at the edge of the cloud, e.g., a fog device. In this fashion, the fog may be considered a distributed platform that provides computing and storage resources to perform processing or data-intensive tasks such as data analytics, data aggregation, and machine-learning, among others.

As an example, this interconnected IoT network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

In various examples, the operations and functionality described herein may be embodied by a machine, or set of machines in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Moreover, the operations and functionality described above may apply to a variety of network configurations, including IoT networking, edge networking, fog networking, cloud networking, and all hybrids thereof.

Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor or processing circuitry (e.g., a computer) to individually or jointly execute instructions to perform any one or more of the methodologies discussed herein.

In IoT networks, many different devices may contribute to a single aggregated packet of information that may then be passed on to a single receiver (e.g., actuator, controller, etc.) that performs a function based on the aggregate value. For example, an industrial park region may have environmental sensors that measure toxic and non-toxic gases, particulates, humidity, or temperature. An aggregate measurement may be computed by a concentrator sensor, for example, by taking the mean, mode, or median of discrete measurements.

Other data functions may be used instead of central tendency functions, such as selecting a maximum or minimum value from the discrete measurements, performing statistical analysis, or the like. The concentrator sensor forwards to other monitoring nodes or controller nodes.

The information should be considered as an aggregated whole (e.g., an "atomic measurement"), but the receiver may still want to validate each source piece for integrity. For this added degree of data integrity assurance, the receiver may need to decompose the aggregate data into its constituent parts in order to perform piecemeal validations. Traditional data aggregation methods do not preserve data provenance or expose sensor oracles (e.g., data generators) hidden behind an aggregator node (e.g., concentrator sensor) within an IoT network topology.

The aggregate data may include sensor data along with other types of data, such as network transport path information, time, logging information, or the like. The receiver may validate the contents of the aggregate data, the routing information, or source device information. Other aspects are described below.

FIG. 1 illustrates a drawing of a cloud computing network, or cloud 100, in communication with a number of Internet of Things (IoT) devices. The cloud 100 may represent the Internet, or may be a local area network (LAN), or a wide area network (WAN), such as a proprietary network for a company. The IoT devices may include any number of different types of devices, grouped in various combinations. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 100 through wired or wireless links 108, such as LPWA links, optical links, and the like. Further, a wired or wireless sub-network 112 may allow the IoT devices to communicate with each other, such as through a local area network, a wireless local area network, and the like. The IoT devices may use another device, such as a gateway 110 or 128 to communicate with remote locations such as the cloud 100; the IoT devices may also use one or more servers 130 to facilitate communication with the cloud 100 or with the gateway 110. For example, the one or more servers 130 may operate as an intermediate network node to support a local edge cloud or fog implementation among a local area network. Further, the gateway 128 that is depicted may operate in a cloud-to-gateway-to-many edge devices configuration, such as with the various IoT devices 114, 120, 124 being constrained or dynamic to an assignment and use of resources in the cloud 100.

Other example groups of IoT devices may include remote weather stations 114, local information terminals 116, alarm systems 118, automated teller machines 120, alarm panels 122, or moving vehicles, such as emergency vehicles 124 or other vehicles 126, among many others. Each of these IoT devices may be in communication with other IoT devices, with servers 104, with another IoT fog device or system, or a combination therein. The groups of IoT devices may be deployed in various residential, commercial, and industrial settings (including in both private or public environments).

As may be seen from FIG. 1, a large number of IoT devices may be communicating through the cloud 100. This may allow different IoT devices to request or provide information to other devices autonomously. For example, a group of IoT devices (e.g., the traffic control group 106) may request a current weather forecast from a group of remote weather stations 114, which may provide the forecast without human intervention. Further, an emergency vehicle 124 may be alerted by an automated teller machine 120 that a burglary is in progress. As the emergency vehicle 124 proceeds towards the automated teller machine 120, it may access the traffic control group 106 to request clearance to the location, for example, by lights turning red to block cross traffic at an intersection in sufficient time for the emergency vehicle 124 to have unimpeded access to the intersection.

Clusters of IoT devices, such as the remote weather stations 114 or the traffic control group 106, may be equipped to communicate with other IoT devices as well as with the cloud 100. This may allow the IoT devices to form an ad-hoc network between the devices, allowing them to function as a single device, which may be termed a fog device or system (e.g., as described above).

Figure 2:
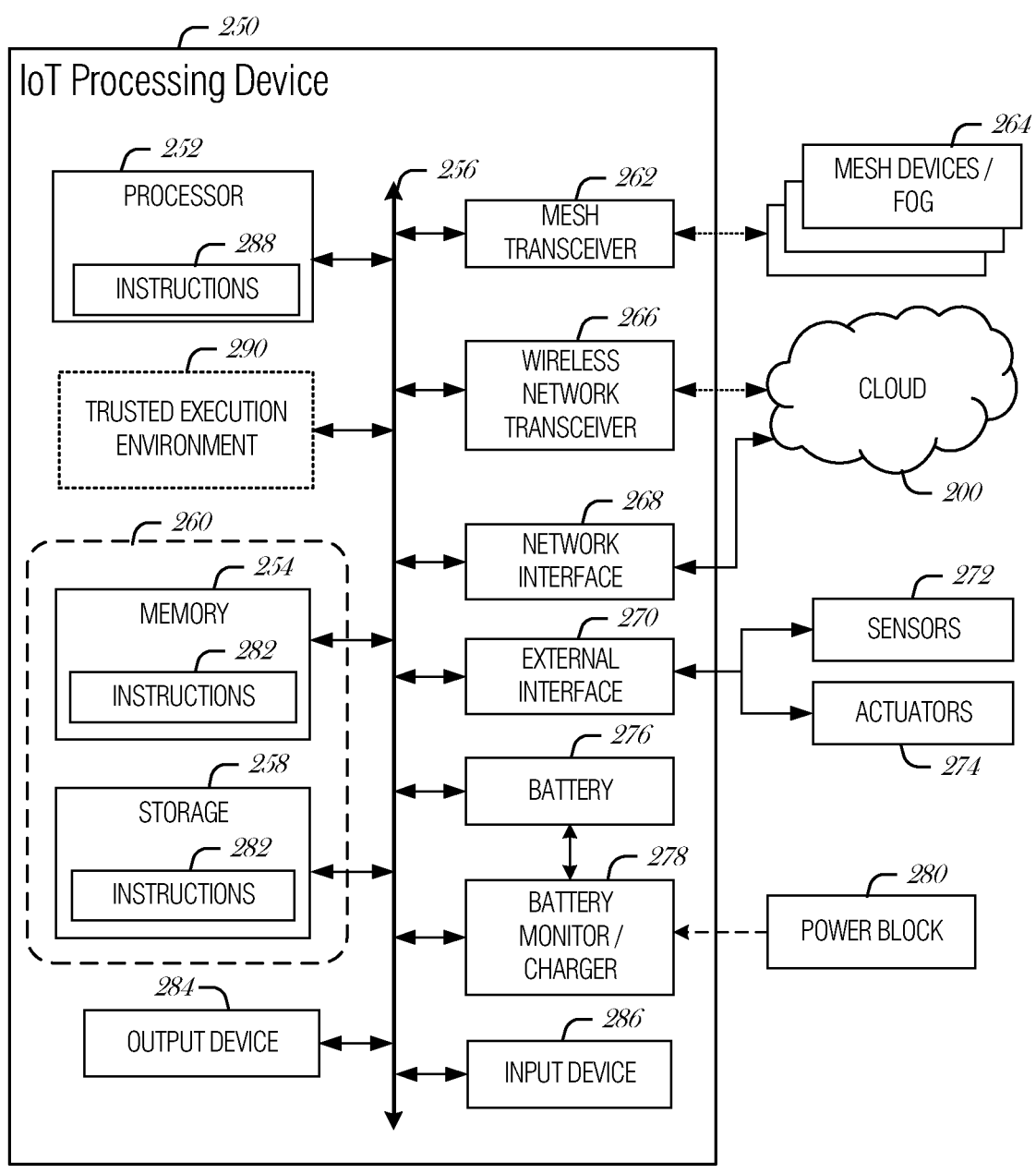
FIG. 2 is a block diagram of an example of components that may be present in an IoT device for implementing the techniques described herein.

FIG. 2 is a block diagram of an example of components that may be present in an IoT device 250 for implementing the techniques described herein. The IoT device 250 may include any combinations of the components shown in the example or referenced in the disclosure above. The components may be implemented as ICs, portions thereof, discrete electronic devices, or other modules, logic, hardware, software, firmware, or a combination thereof adapted in the IoT device 250, or as components otherwise incorporated within a chassis of a larger system. Additionally, the block diagram of FIG. 2 is intended to depict a high-level view of components of the IoT device 250. However, some of the components shown may be omitted, additional components may be present, and different arrangement of the components shown may occur in other implementations.

The IoT device 250 may include a processor 252 (e.g., processing circuitry), which may be a microprocessor, a multi-core processor, a multithreaded processor, an ultra-low voltage processor, an embedded processor, or other known processing element. The processor 252 may be a part of a system on a chip (SoC) in which the processor 252 and other components are formed into a single integrated circuit, or a single package, such as the Edison™ or Galileo™ SoC boards from Intel. As an example, the processor 252 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A11 processor from Apple® Inc., a Snapdragon™ processor from Qualcomm® Technologies, Inc., or an OMAP™ processor from Texas Instruments, Inc.

The processor 252 may communicate with a system memory 254 over an interconnect 256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 258 may also couple to the processor 252 via the interconnect 256. In an example, the storage 258 may be implemented via a solid state disk drive (SSDD). Other devices that may be used for the storage 258 include flash memory cards, such as SD cards, microSD cards, xD picture cards, and the like, and USB flash drives. In low power implementations, the storage 258 may be on-die memory or registers associated with the processor 252. However, in some examples, the storage 258 may be implemented using a micro hard disk drive (HDD). Further, any number of new technologies may be used for the storage 258 in addition to, or instead of, the technologies described, such resistance change memories, phase change memories, holographic memories, or chemical memories, among others.

The components may communicate over the interconnect 256. The interconnect 256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 256 may be a proprietary bus, for example, used in a SoC based system. Other bus systems may be included, such as an I2C interface, an SPI interface, point to point interfaces, and a power bus, among others.

The interconnect 256 may couple the processor 252 to a mesh transceiver 262, for communications with other mesh devices 264. The mesh transceiver 262 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 264. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 262 may communicate using multiple standards or radios for communications at different range. For example, the IoT device 250 may communicate with close devices, e.g., within about 2 meters, using a local transceiver based on BLE, or another low power radio, to save power. More distant mesh devices 264, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 266 may be included to communicate with devices or services in the cloud 200 via local or wide area network protocols. The wireless network transceiver 266 may be a LPWA transceiver that follows the IEEE 802.15.4, or IEEE 802.15.4g standards, among others. The IoT device 250 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 262 and wireless network transceiver 266, as described herein. For example, the radio transceivers 262 and 266 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 262 and 266 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 266, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 268 may be included to provide a wired communication to the cloud 200 or to other devices, such as the mesh devices 264. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 268 may be included to allow connect to a second network, for example, a NIC 268 providing communications to the cloud over Ethernet, and a second NIC 268 providing communications to other devices over another type of network.

The interconnect 256 may couple the processor 252 to an external interface 270 that is used to connect external devices or subsystems. The external devices may include sensors 272, such as accelerometers, level sensors, flow sensors, optical light sensors, camera sensors, temperature sensors, a global positioning system (GPS) sensors, pressure sensors, barometric pressure sensors, and the like. The external interface 270 further may be used to connect the IoT device 250 to actuators 274, such as power switches, valve actuators, an audible sound generator, a visual warning device, and the like.

In some optional examples, various input/output (I/O) devices may be present within, or connected to, the IoT device 250. For example, a display or other output device 284 may be included to show information, such as sensor readings or actuator position. An input device 286, such as a touch screen or keypad may be included to accept input. An output device 284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 250.

A battery 276 may power the IoT device 250, although in examples in which the IoT device 250 is mounted in a fixed location, it may have a power supply coupled to an electrical grid. The battery 276 may be a lithium ion battery, or a metal-air battery, such as a zinc-air battery, an aluminum-air battery, a lithium-air battery, and the like.

A battery monitor/charger 278 may be included in the IoT device 250 to track the state of charge (SoCh) of the battery 276. The battery monitor/charger 278 may be used to monitor other parameters of the battery 276 to provide failure predictions, such as the state of health (SoH) and the state of function (SoF) of the battery 276. The battery monitor/charger 278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 278 may communicate the information on the battery 276 to the processor 252 over the interconnect 256. The battery monitor/charger 278 may also include an analog-to-digital (ADC) convertor that allows the processor 252 to directly monitor the voltage of the battery 276 or the current flow from the battery 276. The battery parameters may be used to determine actions that the IoT device 250 may perform, such as transmission frequency, mesh network operation, sensing frequency, and the like.

A power block 280, or other power supply coupled to a grid, may be coupled with the battery monitor/charger 278 to charge the battery 276. In some examples, the power block 280 may be replaced with a wireless power receiver to obtain the power wirelessly, for example, through a loop antenna in the IoT device 250. A wireless battery charging circuit, such as an LTC4020 chip from Linear Technologies of Milpitas, California, among others, may be included in the battery monitor/charger 278. The specific charging circuits chosen depend on the size of the battery 276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 258 may include instructions 282 in the form of software, firmware, or hardware commands to implement the techniques described herein. Although such instructions 282 are shown as code blocks included in the memory 254 and the storage 258, it may be understood that any of the code blocks may be replaced with hardwired circuits, for example, built into an application specific integrated circuit (ASIC).

In an example, the instructions 282 provided via the memory 254, the storage 258, or the processor 252 may be embodied as a non-transitory, machine readable medium 260 including code to direct the processor 252 to perform electronic operations in the IoT device 250. The processor 252 may access the non-transitory, machine readable medium 260 over the interconnect 256. For instance, the non-transitory, machine readable medium 260 may be embodied by devices described for the storage 258 of FIG. 2 or may include specific storage units such as optical disks, flash drives, or any number of other hardware devices. The non-transitory, machine readable medium 260 may include instructions to direct the processor 252 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

In an OCF architecture, entities in the real physical world (e.g., a temperature sensor) are represented as resources. Interactions with entities are implemented through resource representations, which use operations that adhere to Representational State Transfer (REST) architectures, e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE, RETRIEVE, UPDATE, DELETE, and NOTIFY (CRUDN)).

Figure 3:
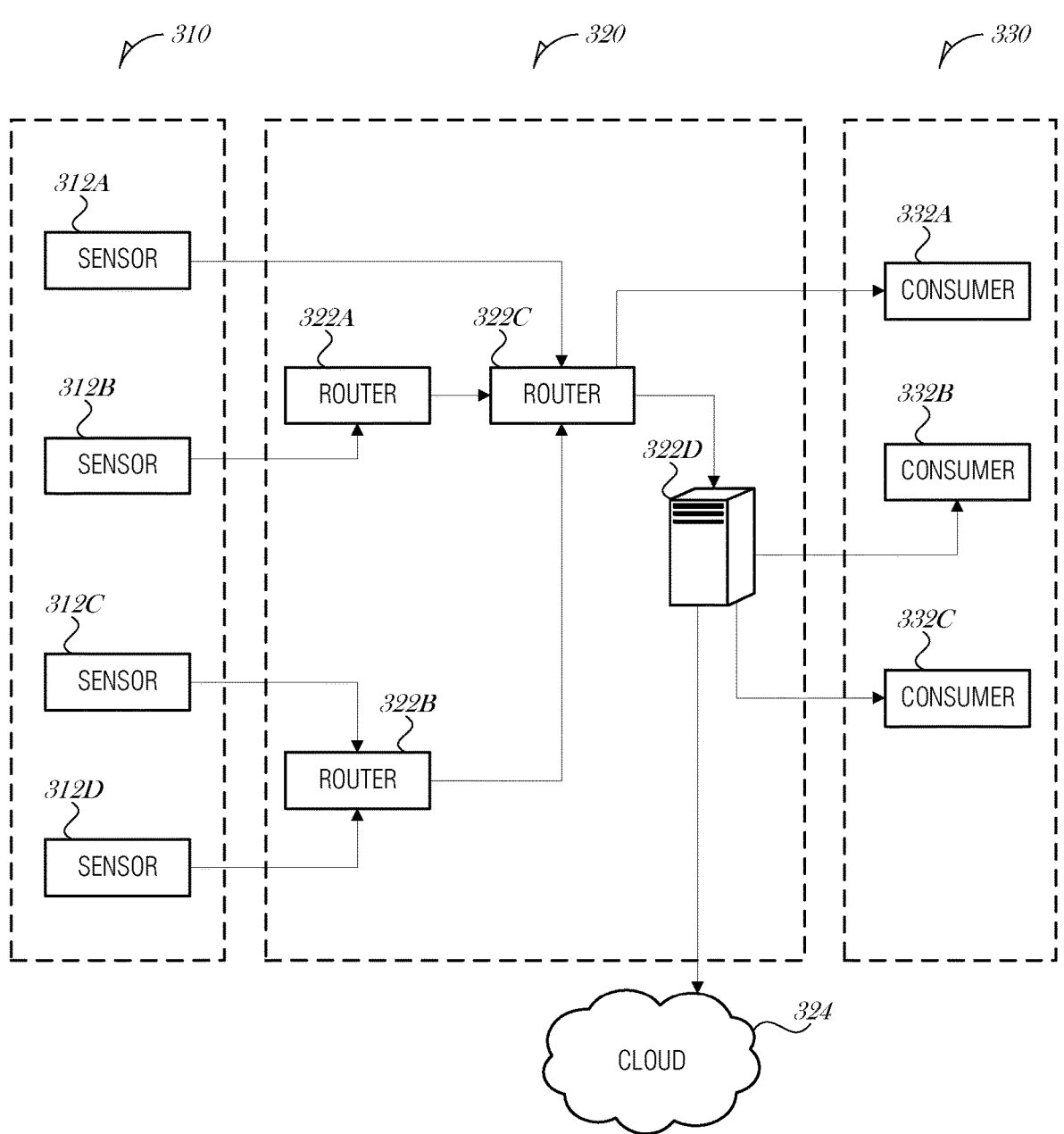
FIG. 3 is a block diagram illustrating an IoT network, according to an embodiment.

FIG. 3 is a block diagram illustrating an IoT network 300, according to an embodiment. The IoT network 300 includes a sensor layer 310, a network layer 320, and an output layer 330. The sensor layer 310 includes sensors 312A-D, which may be instances of sensors 272 of FIG. 2. The sensors 312A-D may be video or still image cameras, smoke detectors, carbon dioxide detectors, light sensors, humidity sensors, presence sensors, or the like.

Data from the sensors 312A-D is transmitted to one or more networking components 322A-D in the network layer 320. The networking components 322A-D may include routers, data aggregators, compute devices, complex sensors, or other devices that are able to receive data from a sensor 312A-D, process the data, and transmit the data toward devices in the output layer 330 or offsite, such as to a cloud 324. The networking components 322A-D may include rules or other configuration information to control how to respond to input data received from the sensors 312A-D. In addition to performing data operations to the input sensor data, the networking components 322A-D may also timestamp the information, perform logging actions, tag data with signatures or other identifiers, or the like. The networking components 322A-D may have synchronized clocks to provide accurate timing information.

Data, either aggregated or unaggregated, may be consumed by one or more data consumers 332A-C in the output layer 330. The data consumers 332A-C may be various types of devices, such as actuators, displays, lights, compute devices, or the like.

Figure 4:
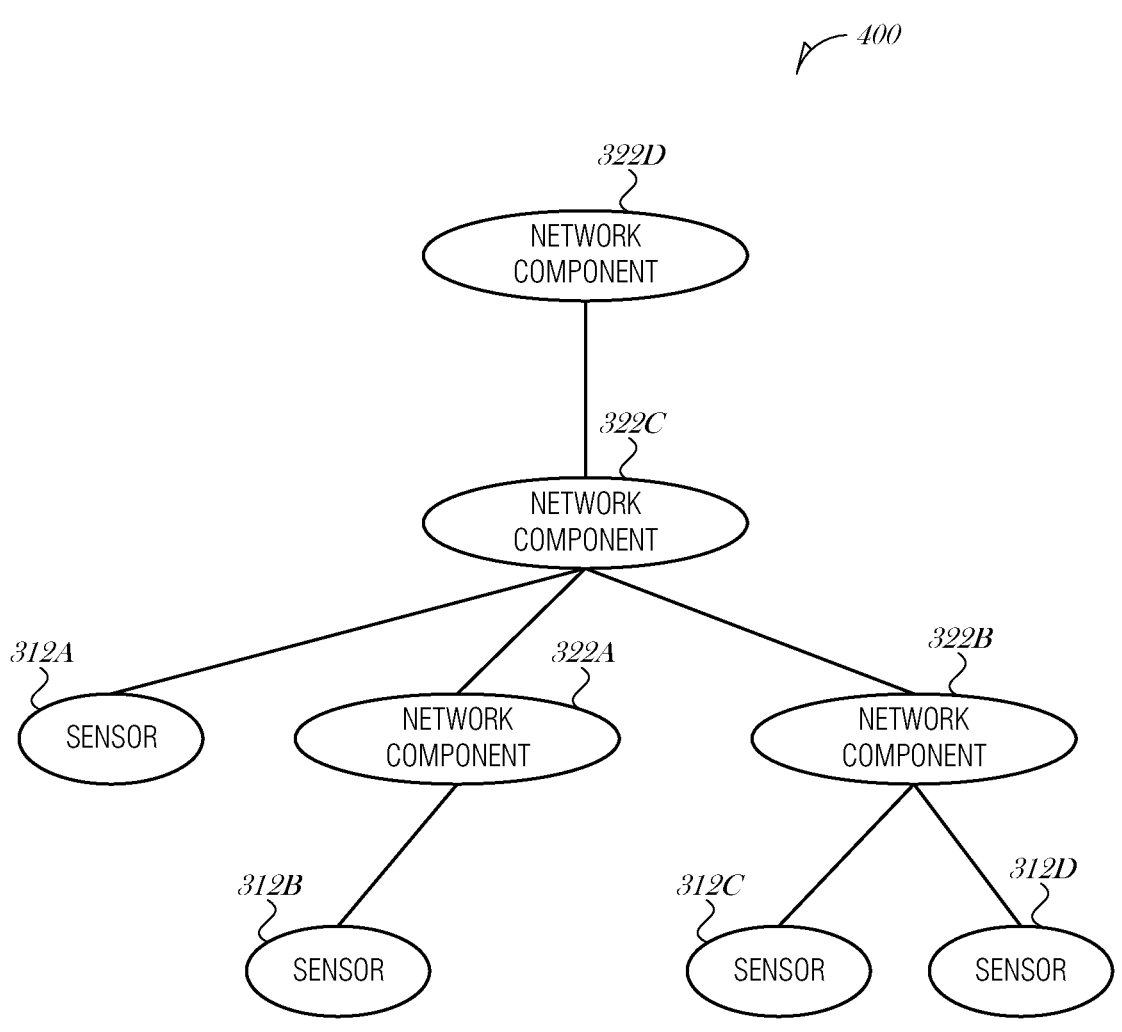
FIG. 4 is a block diagram illustrating the IoT network of FIG. 3, represented as an N-ary tree, according to an embodiment.

FIG. 4 is a block diagram illustrating the IoT network 300 of FIG. 3, represented as an N-ary tree 400, according to an embodiment. The sensors 312A-D are illustrated as leaf nodes in the tree 400. Network components 322A-C are intermediate nodes in the tree 400. Network component 322D is the root of the tree 400. This visualization of the IoT network 300 illustrates how a hash tree, or Merkle tree, may be used to verify the data in the network 300. Data received from sensors 312A-D or from other peers in the network 300 may be validated to ensure that the data is received unaltered.

Figure 5:
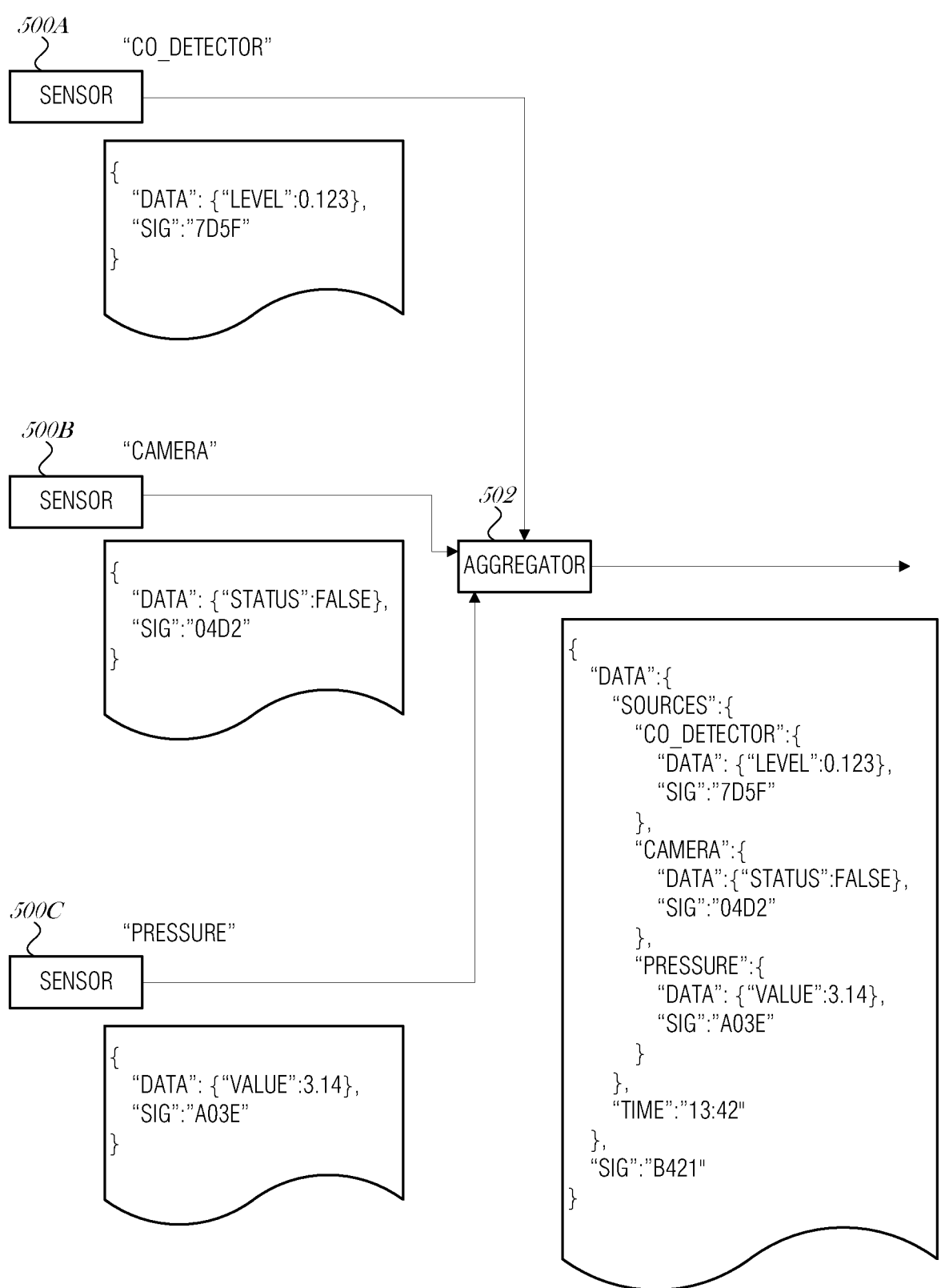
FIG. 5 is a block diagram illustrating use of various data structures to implement data integrity mechanisms in an IoT network, according to an embodiment.

FIG. 5 is a block diagram illustrating use of various data structures to implement data integrity mechanisms in an IoT network, according to an embodiment. Several sensors 500A-C may collect, sense, or otherwise obtain data. The sensors 500A-C output the data to an aggregator 502. Sensors 500A-C may be instances of sensors 312A-D of FIG. 3. Aggregator 502 may be an instance of a networking component 322A-D of FIG. 3.

When a sensor 500A-C transmits data up the IoT network, the data in the corresponding message 504A-C may be signed by the sensor 500A-C. The signature may be a cryptographic signature. A message 504A-C includes a data field and a signature field. The data in the data field may be encrypted, but this is optional and may be used depending on the security requirements of the IoT network. The data field includes one or more {name: value} tuples.

The aggregator 502 aggregates data received from the sensors 500A-C into an aggregated message 506. The aggregated message 506 includes the data messages 504A-C of each of the sensors 500A-C that the aggregator 502 works on. The aggregator 502 adds additional metadata to the aggregated message 506, which includes at least a signature of the aggregator 502. Optionally, the aggregator 502 may timestamp the aggregated message 506 with a time field.

The aggregator may have a security policy that specifies attributes that should not be incorporated into the SOURCES and/or into DATA attributes. Alternatively, a security policy may specify data transformation functions that obfuscate the data to reduce granularity. For example, data is streaming or an image where pixel depth is a form of encoding, the aggregator 502 implements a security policy to reduce pixel depth of certain subject matter in the image (to preserve privacy). The aggregator 502 may apply a blinding factor to data values such as blind_data=XOR (data, blinding_value) where the blind_data is used instead of DATA. Other more sophisticated blinding functions may be applied. Thus, a derivative of the sensed data (e.g., derivative data) may be included in the aggregated message 506, where a security policy and/or filtering function may remove or obfuscate sensed data to achieve a security or privacy objective. Derivative data may be a hashed, encrypted, bit-shifted, transformed, or otherwise altered value of the original data. For instance, using an exclusive OR function with a predetermined blinding_value, the original data is masked or obscured in a way that is reversible.

Each message contains one "data" field containing information specific to that source and a "sig" field that contains a cryptographic signature of the message. The message itself may be encrypted, but that is not shown. The aggregator 502 collates the source messages as its own data (in the "SOURCES" tuple) and adds more information to the data field, (e.g., the "TIME" tuple). Then the aggregator 502 calculates its own signature value based on the contents of the data field, without discarding each source's signature.

A receiver may verify the integrity of the entire aggregated messages, as well as the individual parts, to authenticate each data source and the aggregator itself. In effect, the signature block of each data source is a hash of the data of that source, and the signature block of the aggregator is a hash of the data received from the sources that are being aggregated. Individual data may be verified by the corresponding data source's hash signature, while aggregated data may be verified using the aggregator signature. Various cryptographic hash functions may be used, including but not limited to RSA, SHA-1, SHA-2, SHA-3, MD5, BLAKE, BLAKE2, or the like. The hashes contained in the signature blocks may be signed (e.g., encrypted) using a key associated with the transmitting node. If the key is a symmetric key, then the key may be known by all IoT devices in a neighborhood or domain of the network. If the key is a PKI key, then the public key may be known by all IoT devices in a neighborhood or domain of the network.

Additionally, if any part of the aggregated message is corrupt, it is possible to recover other portions that are not affected. For example, if in the example, the "CAMERA/data/status" field was changed to TRUE by the aggregator 502, a receiver is still able to validate the "CO_DETECTOR" and "PRESSURE" messages. The receiver may even verify whether the timestamp provided by the aggregator 502 is valid, using the aggregator's signature.

Figure 6:
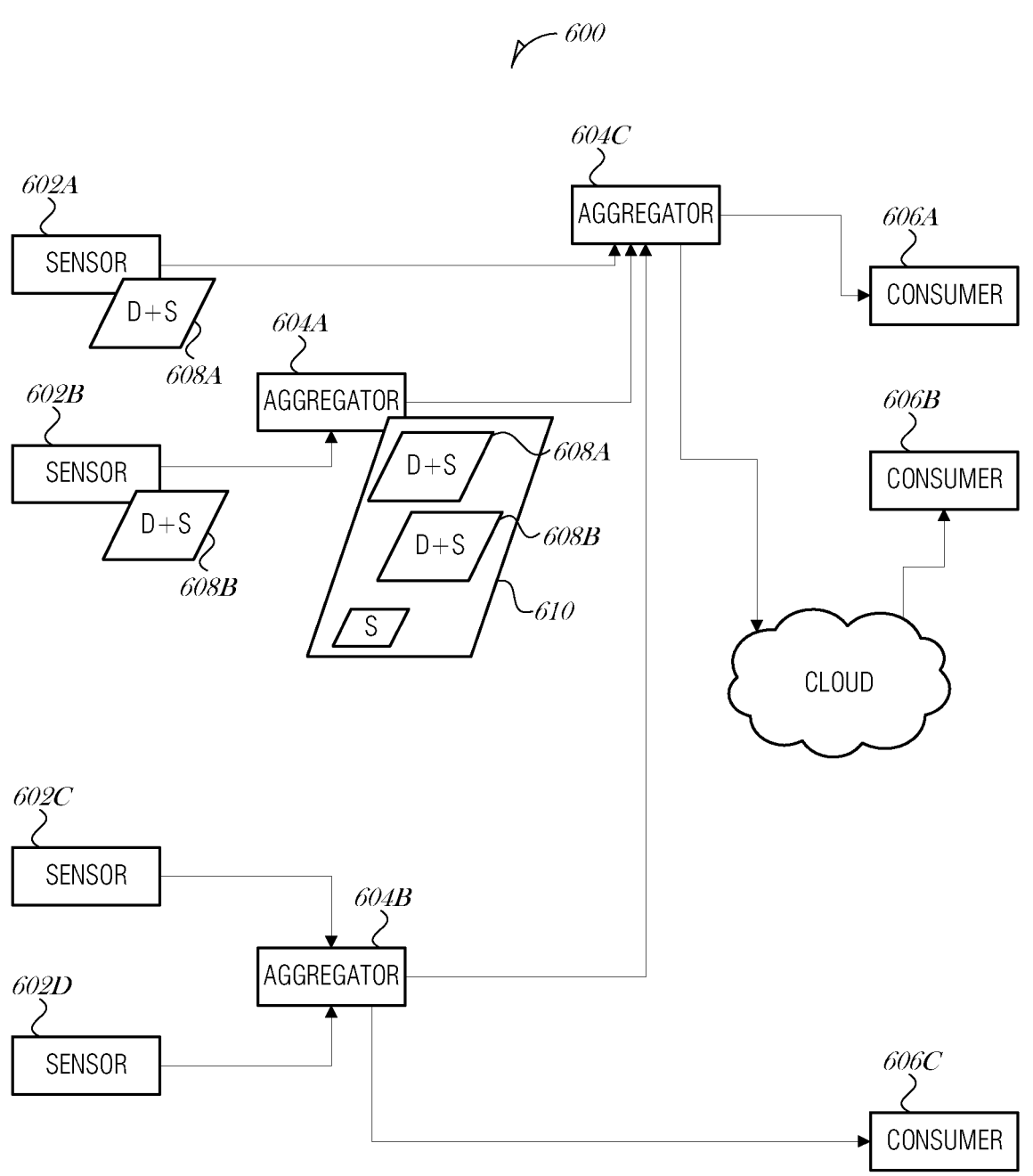
FIG. 6 is a block diagram illustrating data and control flow in an IoT network, according to an embodiment.

FIG. 6 is a block diagram illustrating data and control flow in an IoT network 600, according to an embodiment. The IoT network 600 includes a number of sensors 602A-D, aggregators 604A-C, and data consumers 606A-C. The sensors 602A-D (collectively referred to as 602) may be of the types of sensors previously discussed, such as sensor 272 of FIG. 2, or sensors 312A-D of FIG. 3. The aggregators 604A-C (collectively referred to as 604) may be any of various networking components, complex sensors, compute devices, or the like, that receive sensor data, act on it to generate aggregated sensor data, and transmit the aggregated sensor data to a data consumer 606A-C (collectively referred to as 606). Data consumers 606A-C may be an instance of an actuator 274 of FIG. 2 or data consumer 332A-C of FIG. 3, for example.

As data is gathered at a sensor 602, the data may be signed by the sensor 602. The signature may be an encrypted hash of the data that was gathered. The data and its corresponding signature may be stored for later transmission to an aggregator 604. For instance, the data and its signature may be stored as an entry 608 in a buffer or queue to be transmitted serially, or batched, with other data. The buffer or queue may be a circular buffer so that more recently acquired data is stored and older data is expunged.

Data from sensor 602A is stored in entry 608A, and data from sensor 602B is stored in entry 608B. The entries 608A and 608B (collectively referred to as 608) are transmitted to aggregator 604A, which may create its own data entry 610. The data entry 610 created by the aggregator 604A may include the received entries 608, along with additional data.

The additional data may include timestamp information, data summary information, or the like. The aggregator 604A then calculates a hash of the data portion and saves it as a signature of the data entry 610. The hash of the data portion may be signed (e.g., encrypted) using a key held by the aggregator 604A. The aggregated data entry 610 may be used as a portion of a "data" section in a further aggregated data entry (e.g., an aggregated data entry created at aggregator 604C).

Similar to that of the sensor 602, the aggregator 604 may store the aggregated data entry 610 in a buffer or queue, which may be a circular buffer. The aggregated data entry 610 may be published to subscribers in the network (e.g., data consumers 606).

FIG. 7 is a flowchart illustrating a method 700 of using integrity values, according to an embodiment. The operations of the method 700 are performed by hardware, such as that described above or below (e.g., processor 252, processor subsystem, or processing circuitry). Processor 252 is an example of structure that provides the means for performing the functionality of the method 700.

At 702, each IoT node boots in a secure manner. The node configuration and boot sequence may be contained in a Trusted Computing Group (TCG) Platform Configuration Register (PCR). The node configuration, such as the pre-boot code (e.g., BIOS code or UEFI), master boot record (MBR) code, operating system (OS) loader, application state or version, or the like, may be added or updated in the PCR. After boot, the PCR includes a hash chain of booted software.

At 704, each node discovers nearest neighbor nodes. A registry of nearest neighbors is kept at each node. The registry may be stored in a Nearest Neighbor Integrity Registers (NNIR) data structure. The NNIR includes the nearest neighbor identity and corresponding integrity data (e.g., data from the nearest neighbors' PCRs). The NNIR may also store a nearest neighbor topology.

For instance, the data structure of FIG. 5 (or one similar in structure) may contain connectivity information such as an IP address or DNS (Domain Name System) name. The SOURCES structure in the aggregated message may regard name in the form of a URI, DNS, or IP address or other network naming convention. A discovery protocol broadcast (e.g., IP multi-cast) may be used to find all devices connected to a common subnet. The discovery protocol may supply the SOURCES names or a value that may be keyed to a directory service that returns the SOURCES names values. A routing table may be consulted to identify "nearness." Additionally a network latency test may be performed on discovered devices to improve granularity of "nearness."

At 706, as each node senses data values, it stores the data values in respective entries in a Data Integrity Register (DIR). The DIR for a given node includes values sensed at that node, along with an integrity hash computed for each respective value. The integrity hash is a hash of the data. Optionally, the hash may be signed (e.g., encrypted) by the node. A ring of buffers may be used to store a history of data values and corresponding integrity values. The DIR forms a leaf in a Provenance Manifest Structure (PMS).

At 708, data entries from multiple nodes is transmitted to an aggregator node. The data entries include at least the data and corresponding integrity hashes of the data. Optionally, the data may include time information.

At 710, The aggregator node collects DIRs, PCRs, and NNIRs of each sending sensor node. The aggregator node applies an aggregate collection method (ACM) that resolves indeterminism introduced by network behavior so that data collects may be described as a sequential network topology path traversal.

At 712, the aggregator node verifies the provenance of the data from the sensor nodes. For instance, the aggregator node may determine validate the PCR of each sending sensor node, validate the DIRs of each sending sensor node, and validate the DIRs of nearest neighbor nodes of the sending sensor nodes. The aggregate node may determine the nearest neighbor nodes using the ACM path. Validation of the DIRs and the PCRs are performed using a cryptographic hash. The specific hash used for a DIR or PCR may be discovered by analyzing the PCR, receiving the hash as part of onboarding or other discovery mechanism, identifying a pre-configured setting, or the like.

At 714, the aggregator node acts on the received sensor data. The aggregator node may compute an average, a mean, a median, or perform some other data transformation function on the received sensor data. The result of the action is an aggregate value. Additionally, the aggregator node may collect data values of its own (e.g., when it acts as both a sensor and an aggregator, in a complex sensor capacity). This additional sensed data may be used with the received sensor data in the data transformation function.

At 716, the aggregator node updates its own DIR with the aggregate value. The aggregator node adds the aggregated value to the PMS as another data entry (operation 718). Then, the aggregator node exposes the aggregate value and the PMS to its subscriber community (operation 720). The data may be exposed by providing accessibility to the data, such as by way of access control list (ACL), access control entry (ACE), or policy controls.

FIG. 8 is a flowchart illustrating a method 800 for using hash signatures to validate data in an internet of things (IoT) network, according to an embodiment. The operations of the method 800 are performed by hardware, such as that described above or below (e.g., processor 252, processor subsystem, or processing circuitry). Processor 252 is an example of structure that provides the means for performing the functionality of the method 800.

At 802, input data is accessed at an aggregator node, the input data including sensor data from a plurality of sensor nodes, each sensor data having a respective signature. In an embodiment, the input data includes data sensed by the aggregator node. In another embodiment, the input data includes derivative data of data sensed by the plurality of sensor nodes. In an embodiment, the signature is an encrypted hash value of the sensor data. In an embodiment, the input data includes data from another aggregator node in the IoT network.

At 804, the sensor data is validated by using respective cryptographic hash functions on the sensor data and evaluating the respective result using the respective signature.

At 806, an aggregation function is performed on the sensor data to produce aggregate data. In an embodiment, performing the aggregation function includes computing a mean, mode, or median of the sensor data.

At 808, a hash function is executed on the aggregate data to produce a hash value for the aggregate data.

At 810, the sensor data, respective signatures of the sensor data, aggregate data, and hash value for the aggregate data are bundled in a data structure. Bundling refers to operations such as data concatenation, data packaging, data transformation, data aggregation, data formatting, or other data operations to store the sensor data, respective signatures, aggregate data, and hash value together. In an embodiment, the sensor data and the respective signatures of the sensor data are unmodified to allow the subscriber nodes to validate the sensor data using the respective signatures.

At 812, the data structure is exposed to subscriber nodes on the IoT network. The data may be exposed by providing accessibility to the data, such as by way of access control list (ACL), access control entry (ACE), or policy controls. In an embodiment, the data structure is organized to reflect a network topology of the IoT network.

In an embodiment, the method 800 includes adding timestamp data to the data structure to timestamp the sensor data, and wherein the timestamp data is included in the aggregate data.

In an embodiment, the method 800 includes signing the hash value using a key associated with the aggregator node, and wherein the hash value in the data structure is the signed hash value.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include processing circuitry with one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Additional Notes & Examples

Example 1 is a system for using hash signatures to validate data in an internet of things (IoT) network, the system comprising: processing circuitry; and a memory device including instructions embodied thereon, wherein the instructions, which when executed by the processing circuitry, configure the processing circuitry to perform operations comprising: accessing input data, at an aggregator node, the input data including sensor data from a plurality of sensor nodes, each sensor data having a respective signature; validating the sensor data by using respective cryptographic hash functions on the sensor data and evaluating the respective result using the respective signature; performing an aggregation function on the sensor data to produce aggregate data; executing a hash function on the aggregate data to produce a hash value for the aggregate data; bundling the sensor data, respective signatures of the sensor data, aggregate data, and hash value for the aggregate data in a data structure; and exposing the data structure to subscriber nodes on the IoT network.

In Example 2, the subject matter of Example 1 includes, wherein the input data includes data sensed by the aggregator node.

In Example 3, the subject matter of Examples 1-2 includes, wherein the input data includes derivative data of data sensed by the plurality of sensor nodes.

In Example 4, the subject matter of Examples 1-3 includes, wherein the signature is an encrypted hash value of the sensor data.

In Example 5, the subject matter of Examples 1-4 includes, wherein the input data includes data from another aggregator node in the IoT network.

In Example 6, the subject matter of Examples 1-5 includes, wherein performing the aggregation function includes computing a mean, mode, or median of the sensor data.

In Example 7, the subject matter of Examples 1-6 includes, wherein the sensor data and the respective signatures of the sensor data are unmodified to allow the subscriber nodes to validate the sensor data using the respective signatures.

In Example 8, the subject matter of Examples 1-7 includes, operations of adding timestamp data to the data structure to timestamp the sensor data, and wherein the timestamp data is included in the aggregate data.

In Example 9, the subject matter of Examples 1-8 includes, wherein the data structure is organized to reflect a network topology of the IoT network.

In Example 10, the subject matter of Examples 1-9 includes, operations of signing the hash value using a key associated with the aggregator node, and wherein the hash value in the data structure is the signed hash value.

Example 11 is a method for using hash signatures to validate data in an internet of things (IoT) network, the method comprising: accessing input data, at an aggregator node, the input data including sensor data from a plurality of sensor nodes, each sensor data having a respective signature; validating the sensor data by using respective cryptographic hash functions on the sensor data and evaluating the respective result using the respective signature; performing an aggregation function on the sensor data to produce aggregate data; executing a hash function on the aggregate data to produce a hash value for the aggregate data; bundling the sensor data, respective signatures of the sensor data, aggregate data, and hash value for the aggregate data in a data structure; and exposing the data structure to subscriber nodes on the IoT network.

In Example 12, the subject matter of Example 11 includes, wherein the input data includes data sensed by the aggregator node.

In Example 13, the subject matter of Examples 11-12 includes, wherein the input data includes derivative data of data sensed by the plurality of sensor nodes.

In Example 14, the subject matter of Examples 11-13 includes, wherein the signature is an encrypted hash value of the sensor data.

In Example 15, the subject matter of Examples 11-14 includes, wherein the input data includes data from another aggregator node in the IoT network.

In Example 16, the subject matter of Examples 11-15 includes, wherein performing the aggregation function includes computing a mean, mode, or median of the sensor data.

In Example 17, the subject matter of Examples 11-16 includes, wherein the sensor data and the respective signatures of the sensor data are unmodified to allow the subscriber nodes to validate the sensor data using the respective signatures.

In Example 18, the subject matter of Examples 11-17 includes, adding timestamp data to the data structure to timestamp the sensor data, and wherein the timestamp data is included in the aggregate data.

In Example 19, the subject matter of Examples 11-18 includes, wherein the data structure is organized to reflect a network topology of the IoT network.

In Example 20, the subject matter of Examples 11-19 includes, signing the hash value using a key associated with the aggregator node, and wherein the hash value in the data structure is the signed hash value.

Example 21 is at least one machine-readable medium including instructions, which when executed by a machine, cause the machine to perform operations of any of the methods of Examples 11-20.

Example 22 is an apparatus comprising means for performing any of the methods of Examples 11-20.

Example 23 is an apparatus for using hash signatures to validate data in an internet of things (IoT) network, the apparatus comprising: means for accessing input data, at an aggregator node, the input data including sensor data from a plurality of sensor nodes, each sensor data having a respective signature; means for validating the sensor data by using respective cryptographic hash functions on the sensor data and evaluating the respective result using the respective signature; means for performing an aggregation function on the sensor data to produce aggregate data; means for executing a hash function on the aggregate data to produce a hash value for the aggregate data; means for bundling the sensor data, respective signatures of the sensor data, aggregate data, and hash value for the aggregate data in a data structure; and means for exposing the data structure to subscriber nodes on the IoT network.

In Example 24, the subject matter of Example 23 includes, wherein the input data includes data sensed by the aggregator node.

In Example 25, the subject matter of Examples 23-24 includes, wherein the input data includes derivative data of data sensed by the plurality of sensor nodes.

In Example 26, the subject matter of Examples 23-25 includes, wherein the signature is an encrypted hash value of the sensor data.

In Example 27, the subject matter of Examples 23-26 includes, wherein the input data includes data from another aggregator node in the IoT network.

In Example 28, the subject matter of Examples 23-27 includes, wherein the means for performing the aggregation function include means for computing a mean, mode, or median of the sensor data.

In Example 29, the subject matter of Examples 23-28 includes, wherein the sensor data and the respective signatures of the sensor data are unmodified to allow the subscriber nodes to validate the sensor data using the respective signatures.

In Example 30, the subject matter of Examples 23-29 includes, means for adding timestamp data to the data structure to timestamp the sensor data, and wherein the timestamp data is included in the aggregate data.

In Example 31, the subject matter of Examples 23-30 includes, wherein the data structure is organized to reflect a network topology of the IoT network.

In Example 32, the subject matter of Examples 23-31 includes, means for signing the hash value using a key associated with the aggregator node, and wherein the hash value in the data structure is the signed hash value.

Example 33 is at least one machine-readable medium including instructions for using hash signatures to validate data in an internet of things (IoT) network, the instructions when executed by an aggregator node, cause the aggregator node to perform operations comprising: accessing input data, the input data including sensor data from a plurality of sensor nodes, each sensor data having a respective signature; validating the sensor data by using respective cryptographic hash functions on the sensor data and evaluating the respective result using the respective signature; performing an aggregation function on the sensor data to produce aggregate data; executing a hash function on the aggregate data to produce a hash value for the aggregate data; bundling the sensor data, respective signatures of the sensor data, aggregate data, and hash value for the aggregate data in a data structure; and exposing the data structure to subscriber nodes on the IoT network.

In Example 34, the subject matter of Example 33 includes, wherein the input data includes data sensed by the aggregator node.

In Example 35, the subject matter of Examples 33-34 includes, wherein the input data includes derivative data of data sensed by the plurality of sensor nodes.

In Example 36, the subject matter of Examples 33-35 includes, wherein the signature is an encrypted hash value of the sensor data.

In Example 37, the subject matter of Examples 33-36 includes, wherein the input data includes data from another aggregator node in the IoT network.

In Example 38, the subject matter of Examples 33-37 includes, wherein performing the aggregation function includes computing a mean, mode, or median of the sensor data.

In Example 39, the subject matter of Examples 33-38 includes, wherein the sensor data and the respective signatures of the sensor data are unmodified to allow the subscriber nodes to validate the sensor data using the respective signatures.

In Example 40, the subject matter of Examples 33-39 includes, the operations further comprising adding timestamp data to the data structure to timestamp the sensor data, and wherein the timestamp data is included in the aggregate data.

In Example 41, the subject matter of Examples 33-40 includes, wherein the data structure is organized to reflect a network topology of the IoT network.

In Example 42, the subject matter of Examples 33-41 includes, the operations further comprising signing the hash value using a key associated with the aggregator node, and wherein the hash value in the data structure is the signed hash value.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for using hash signatures to validate data in a network, the system comprising:

processing circuitry; and a memory device including instructions embodied thereon, wherein the instructions, which when executed by the processing circuitry, configure the processing circuitry to perform operations comprising:

accessing input data, at an aggregator node, the input data including data received from a plurality of remote sensor nodes, each data having a respective signature corresponding to each of the plurality of remote sensor nodes;

validating the data by using respective cryptographic hash functions on the data to obtain a respective result and evaluating the respective result using the respective signature;

accessing sensed data, the sensed data obtained locally by the aggregator node;

signing the sensed data using a signature of the aggregator node;

aggregating the input data and the sensed data to produce aggregate data;

executing a cryptographic hash function on the aggregate data to produce a hash value;

bundling the input data, the sensed data, respective signatures of the input data and the sensed data, the aggregate data, and the hash value for the aggregate data in a data structure; and publishing the data structure to subscriber nodes on the network.

2. The system of claim 1, wherein the processing circuitry is to perform calculating derivative data of the sensed data sensed by the aggregator node.

3. The system of claim 1, wherein the respective signature is an encrypted hash value of the input data.

4. The system of claim 1, wherein the input data includes data from another aggregator node in the network.

5. The system of claim 1, wherein aggregating the input data and the sensed data includes computing a mean, mode, or median of the aggregate data.

6. The system of claim 1, wherein the input data and the respective signatures of the input data are unmodified to allow the subscriber nodes to validate the input data using the respective signatures.

7. The system of claim 1, further comprising operations of adding timestamp data to the data structure to timestamp the input data, and wherein the timestamp data is included in the aggregate data.

8. The system of claim 1, wherein the data structure is organized to reflect a network topology of the network.

9. The system of claim 1, further comprising operations of signing the hash value using a key associated with the aggregator node, and wherein the hash value in the data structure is the signed hash value.

10. A method for using hash signatures to validate data in a network, the method comprising:

accessing input data, at an aggregator node, the input data including data received from a plurality of remote sensor nodes, each data having a respective signature corresponding to each of the plurality of remote sensor nodes;

validating the input data by using respective cryptographic hash functions on each data to obtain a respective result and evaluating the respective result using the respective signature;

accessing sensed data, the sensed data obtained locally by the aggregator node;

signing the sensed data using a signature of the aggregator node;

aggregating the input data and the sensed data to produce aggregate data;

executing a cryptographic hash function on the aggregate data to produce a hash value for the aggregate data;

bundling the input data, the sensed data, respective signatures of the input data and the sensed data, the aggregate data, and the hash value for the aggregate data in a data structure; and publishing the data structure to subscriber nodes on the network.

11. The method of claim 10, comprising calculating derivative data of the sensed data sensed by the aggregator node.

12. The method of claim 10, wherein the respective signature is an encrypted hash value of the input data.

13. The method of claim 10, wherein the input data includes data from another aggregator node in the network.

14. The method of claim 11, wherein aggregating the input data and the sensed data includes computing a mean, mode, or median of the aggregate data.

15. The method of claim 11, wherein the input data and the respective signatures of the input data are unmodified to allow the subscriber nodes to validate the input data using the respective signatures.

16. The method of claim 11, further comprising adding timestamp data to the data structure to timestamp the input data, and wherein the timestamp data is included in the aggregate data.

17. The method of claim 10, wherein the data structure is organized to reflect a network topology of the network.

18. The method of claim 10, further comprising signing the hash value using a key associated with the aggregator node, and wherein the hash value in the data structure is the signed hash value.

* * * * *